| (12) United States Patent<br>Nevada | (10) Patent No.: US 9,760,879 B2<br>(45) Date of Patent: Sep. 12, 2017 |
|---|---|

(54) SYSTEMS, METHODS, AND COMPUTER PROGRAM PRODUCTS FOR PROVIDING AN ELECTRONIC RECEIPT

(75) Inventor: Giselle Katrina Nevada, Pflugerville, TX (US)

(73) Assignee: PayPal, Inc., San Jose, CA (US)

( * ) Notice: Subject to any disclaimer, the term of this patent is extended or adjusted under 35 U.S.C. 154(b) by 117 days.

(21) Appl. No.: 13/599,783

(22) Filed: Aug. 30, 2012

(65) Prior Publication Data

US 2014/0067575 A1 Mar. 6, 2014

(51) Int. Cl.
| | |
|---|---|
| G06Q 40/00 | (2012.01) |
| G06Q 20/20 | (2012.01) |
| G06Q 30/06 | (2012.01) |
| G06Q 30/04 | (2012.01) |
| G06Q 20/12 | (2012.01) |
| G06Q 20/32 | (2012.01) |

(52) U.S. Cl.
CPC ............ *G06Q 20/20* (2013.01); *G06Q 20/12* (2013.01); *G06Q 20/32* (2013.01); *G06Q 30/04* (2013.01); *G06Q 30/06* (2013.01)

(58) Field of Classification Search
None
See application file for complete search history.

(56) References Cited

U.S. PATENT DOCUMENTS 8,606,720 B1 * 12/2013 Baker et al. .................... 705/76
2012/0253958 A1 * 10/2012 Sock et al. ...................... 705/21

* cited by examiner

*Primary Examiner* — Shay S Glass
(74) *Attorney, Agent, or Firm* — Haynes and Boone, LLP

(57) ABSTRACT

The present disclosure provides an exemplary system, method, and computer program product. The exemplary system includes at least one non-transitory memory storing user account information, wherein the information comprises a digital receipt associated with a user purchase and one or more conditions for delivering the digital receipt. The system further includes one or more hardware processors coupled to the at least one memory and operable to read instructions from the at least one memory to perform the steps of: receiving a payment request from a user; receiving at least one condition from the user for delivering a digital receipt associated with the payment request to at least one recipient; determining whether the at least one condition is satisfied; and delivering the digital receipt to the at least one recipient.

18 Claims, 4 Drawing Sheets

SYSTEMS, METHODS, AND COMPUTER PROGRAM PRODUCTS FOR PROVIDING AN ELECTRONIC RECEIPT

BACKGROUND

Technical Field

The present disclosure generally relates to electronic transactions and, more particularly, to techniques for automatically generating an electronic receipt from a Point of Sale (POS) and transmitting the electronic receipt to an identified recipient at a predetermined point in time in the future.

Related Art

It is common for consumers to perform online transactions with an ever-increasing number of online merchants that may or may not have a physical real world counterpart. The popularity of online merchants is partially attributable to the ease and convenience of making and keeping track of online transactions when compared to transactions at physical commercial locations.

Merchants at physical commercial locations are also seeking to incorporate certain electronic transaction features to increase the ease and convenience of making and keeping track of transactions performed at the physical location. However, neither the online merchants nor merchants at physical commercial locations have fully utilized the potential of electronic transactions to create a better shopping experience for their customers.

Therefore, while existing electronic transactions have been generally adequate for their intended purpose, their capabilities have not been fully utilized in certain aspects. Accordingly, it would be advantageous to more fully utilize capabilities of electronic transactions to improve the shopping experience of customers that are shopping at online merchants and at physical commercial locations.

DETAILED DESCRIPTION

Figure 1:
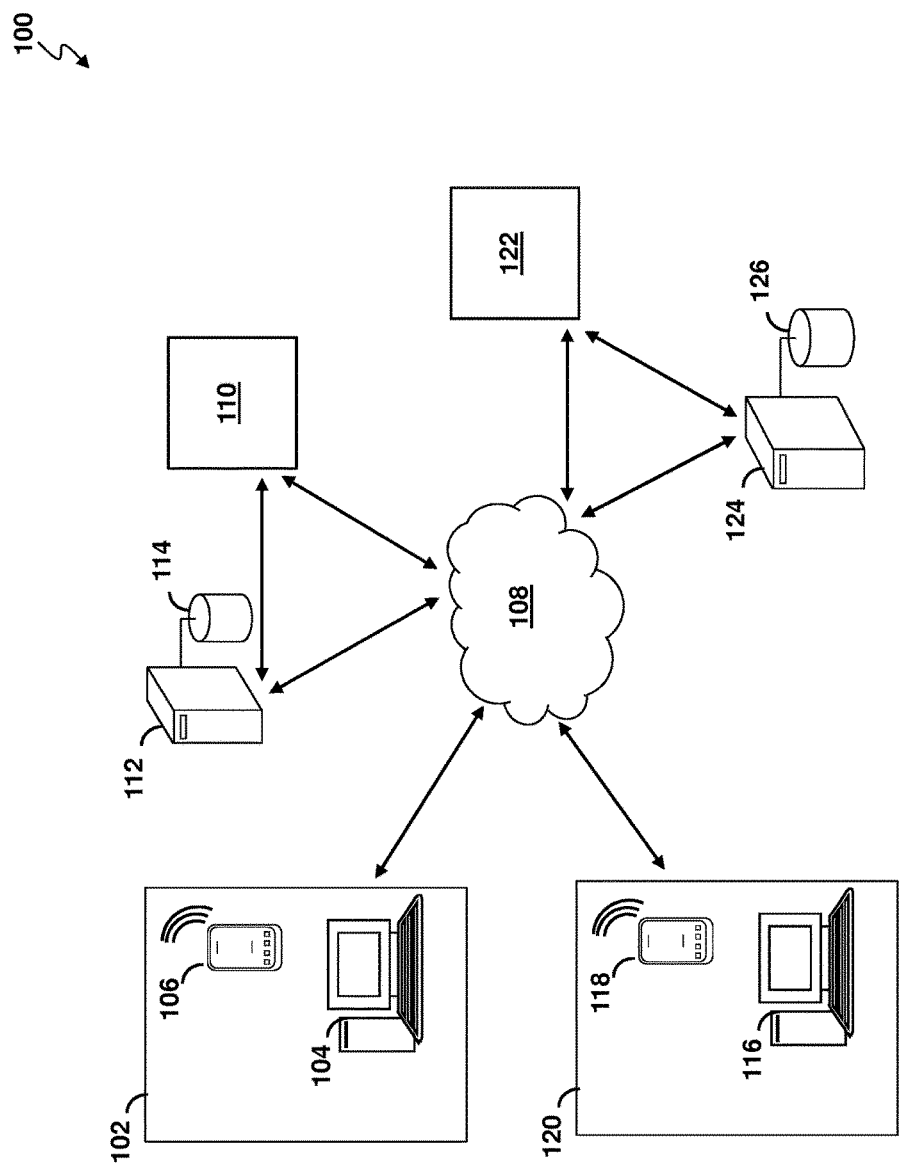
FIG. 1 is an illustration showing a system, according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

One embodiment of the present disclosure involves a system. The system includes at least one non-transitory memory storing user account information, wherein the information comprises a digital receipt associated with a user purchase and one or more conditions for delivering the digital receipt. The system further includes one or more hardware processors coupled to the at least one memory and operable to read instructions from the at least one memory to perform the steps of: receiving a payment request from a user; receiving at least one condition from the user for delivering a digital receipt associated with the payment request to at least one recipient; determining whether the at least one condition is satisfied; and delivering the digital receipt to the at least one recipient.

Another embodiment of the present disclosure involves a method. The method includes receiving a payment request from a user. The method further includes receiving at least one condition from the user for delivering a digital receipt associated with the payment request to at least one recipient. The method further includes determining whether the at least one condition is satisfied. The method further includes delivering, electronically by a hardware processor, the digital receipt to the at least one recipient.

Another embodiment of the present disclosure involves an electronic device. The electronic device includes a non-transitory, tangible computer readable storage medium storing a computer program. The computer program contains instructions that when executed perform: receiving a payment request from a user; receiving at least one condition from the user for delivering a digital receipt associated with the payment request to at least one recipient; determining whether the at least one condition is satisfied; and delivering the digital receipt to the at least one recipient.

As the Internet continues to evolve, consumers have become accustomed to receiving electronic information on computers and on mobile devices. According to the various aspects of the present disclosure, a system, method, and electronic device are discussed below that take advantage of customer's comfort in receiving electronic information to provide an easier and more convenient approach to making and keeping track of their transactions. For instance, one embodiment includes methods whereby a customer makes a purchase at an online merchant and then designates a person and a specific date that the item purchased is to be received by the person. The customer, during or after the online transaction, is also able to designate electronic account information (e.g., email address, telephone number, Facebook, Twitter, etc. . . . ) of the person receiving the purchased item so that an electronic receipt or a link, where the electronic receipt can be accessed, may be sent to the person/recipient based on a condition, such as at a specific date/time or when an event occurs.

Another instance includes embodiments where the customer makes an in-person purchase (e.g., a gift) at a physical merchant. During (or after) the purchase transaction, the customer is given an opportunity to designate electronic account information (e.g., email address, telephone number, Facebook, Twitter, etc. . . . ) for a person receiving the purchased item and a condition, such as a specific date/time or an event when an electronic receipt or a link where the electronic receipt can be accessed, may be sent to the person/recipient or to different recipients. The customer may also provide this information to the merchant, after the purchase transaction, by accessing a website associated with the merchant and optionally logging on, for example, with a username and password or with a code located on a physical receipt received at time of purchase.

The electronic receipt, either transmitted directly or accessed via a link, may take various forms and include various designated content. For example, the electronic receipt may be a digital representation of a complete sales receipt or a limited redacted receipt such as a gift receipt having the purchase price removed or with select information removed that is designated by the customer that made the purchase.

In certain instances, the customer may receive confirmation that the electronic receipt or link was sent and/or accessed by the intended recipient (i.e., person/recipient designated by the customer) or different recipients. Further, the customer may also have the ability to access and/or modify the information of the person/recipient or the form and content of the electronic receipt before the occurrence of the condition.

Thus, according to various embodiments, a customer seeking to purchase an item is provided with the opportunity to designate one or more recipient that is to receive electronic information, such as a digital receipt, based on at least one condition, to thereby provide an easier and more convenient approach to making and keeping track of purchase transactions.

FIG. 1 represents an illustration of a system 100 according to various aspects of the present disclosure. The system 100 is configured to facilitate communication between customer devices, online and physical merchants, and devices of a recipient that is associated with a transaction between the customer and the merchant. In FIG. 1, in accordance with one embodiment, a customer 102 utilizes a computer 104, a mobile device 106, or any appropriate device operable to communicate via a network 108 with online merchants 110 and execute a purchase transaction. The online merchant 110 utilizes server 112 to store purchase related information in database 114. The purchase related information is subsequently sent to computer 116 and/or mobile device 118 of recipient 120 and/or to different recipients at a future point in time according to embodiments described further below.

The computers 104 and 116 may include any computer. Examples include desktop computers or notebook, laptop, and tablet computers. The computers 104 and 116 may include a processor, computer readable medium configured to store executable programs/applications, input/output interface such as a display and keyboard, and network communication elements (e.g., modem, wireless card, etc. . . . ) configured to connect to network 108 via a wired or a wireless network communication. Examples of network connections include LAN, WLAN, PTSN, and/or various other wired or wireless networks, including telecommunications, mobile, and cellular telephone networks such as IEEE 802.11 (WiFi), IEEE 802.15 (Bluetooth), GSM, CDMA, 3G, 4G, LTE, WIMAX, DLNA, HDMI, etc.

Mobile device 106 and 118 may include any type of mobile device configured to access digital data over a network. Examples include a tablet computer (such as an iPad™ tablet computer), an MP3 player (such as an iPod™ music player), an e-book reader (such as the Kindle™ reader), a smartphone (such as the iPhone™ phone) and/or the like. The mobile devices 106 and 118 include programs and/or applications stored on computer readable medium that utilize the above disclosed equipment for input/output (I/O) of data. Mobile devices 106 and 118 include at least one network connection operable to access network 108 communicate with at least one website associated with the online merchant 110 and/or the server 112 associated with the online merchant 112 and/or a website associated with the physical merchant 122 and/or the server 124 associated with physical merchant 122. Servers 112 and 124 may comprise only one server or several servers which may be configured in a cluster or linked together directly/indirectly. Servers 112 and 124 may communicate with their respective associated merchants 110 and 122 either directly (e.g., over a direct communication path) or indirectly (e.g., over network 108) to receive purchase related information and store the information in database 114 and 126, respectively.

Still referring to FIG. 1, online merchant 110 may utilize a webpage accessible by customer 102 devices to present an online store to customers. For example, the webpage of online merchant 110 may be implemented on a server having access to network 108 such that customer 102 devices 104 and 106 may obtain access to the webpage and execute purchase transactions related to various items (e.g., products or services) listed for sale. As part of executing purchase transactions, the webpage may include a form or interface (e.g., GUI) configured to obtain purchase related information such as customer 102 name, address, email, telephone number, payment information (e.g., debit/credit card, PayPal, etc.), and recipient 120 information including name, address, email, telephone number, account, etc. As noted above, online merchant 110 may communicate either directly or indirectly with server 112 to transmit purchase related information which is stored in database 114. As will be described below, the online merchant 110 and/or associated server 112 utilizes the purchase related information to generate an electronic receipt (e.g., a digital receipt) that will be transmitted to devices 116 and/or 118 of recipient 120 and/or different recipients based on at least one condition.

Physical merchant 122 may be a static physical location (e.g., brick-and-mortar storefront) or a dynamic physical location (e.g., mobile sales person). Physical merchant 122 includes equipment for processing customer payment transactions. The equipment processes payment transactions of cash, checks, debit/credit cards, PayPal, etc. . . . , and obtains payment related information such as customer 102 name, address, email, telephone number, and recipient 120 information including name, address, email, telephone number, etc. The equipment may include a barcode scanner, an electronic cash register and/or a card reader (e.g., standard debit/credit card reader and/or PayPal Here card reader) in communication with a computer and/or a mobile device including a processor, memory, and communication module operable to process payment transactions and communicate payment related information over the network 108 to server 124. The equipment may also include a receipt printer, customer terminals, display screen, and other appropriate devices. As will be described below, the physical merchant 122 and/or associated server 124 utilizes the purchase related information to generate an electronic receipt that will be transmitted to devices 116 and/or 118 of recipient 120 and/or different recipients based on at least one condition.

Customer 102 may use computer 104 and/or mobile device 106 to access content provided by online merchant 110 by, e.g., accessing a website of online merchant 110 through a web browser or a specialized application executing on the customer's 102 computer 104 and/or mobile device 106. For example, customer 102 may be seeking to purchase a specific item (e.g., a gift for a person/recipient 120) at a website of the online merchant 110. Using the computer 104 and/or mobile device 106, customer 102 may gain access to the network 108 and thereafter direct a web browser of the computer 104 and/or mobile device 106 to online merchant's 110 website. The online merchant 110 may be any online merchant such as eBay, Amazon, Yahoo Shopping, etc. . . . , that has only an online presence or may be an online merchant such as Best Buy, Costco, Verizon, etc. . . . , that has both an online presence and a physical presence. Once at the online merchant's 110 website, customer 102 views a list of items for sale (e.g., products and/or services) and identifies a specific item sought. After locating the specific item, customer 102 executes a purchase transaction which may include utilizing a form or an interface (e.g., GUI) to provide purchase related information such as customer 102 name, address, email, telephone number, payment information (e.g., bank account, debit/credit card, PayPal, etc. . . . ).

In an embodiment, at the time of the purchase transaction, customer 102 is also allowed to indicate in the form/interface that the purchased item is intended for a different person/recipient (e.g., in the present embodiment, the different person is recipient 120). Where customer 102 indicates that a different person is intended to receive the item purchased, customer 102 is provided an opportunity to input recipient 120 information including name, address, email address, telephone number, etc. The information may also include an intended date that the item purchased is to be received by the recipient 120 (e.g., where the item is intended as a gift, a particular day may be appropriate). In further embodiments, customer 102 also indicates if and when an electronic receipt of the item purchased is to be sent to recipient 120. For instance, customer 102 may indicate at least one condition such as a specific date and/or a specific event (e.g., delivery confirmation) to transmit the electronic receipt to devices 116 and 118 of recipient 120. The specific date may be before, at, or after the time of delivery. Delivery confirmation, for example, may be received by the online merchant 110 from common carriers such as United Postal Service (UPS), Federal Express (FedEx), DHL, United States Postal Service (USPS), etc. In certain embodiments, customer 102 also indicates a preferred method of delivery of the electronic receipt (e.g., email or text message).

Utilizing the form/interface, customer 102 may be also able to indicate the format/information contained in the electronic receipt. For example, the customer may indicate whether the electronic receipt should be a complete sales receipt (i.e., include all information) or if it should be a limited redacted receipt (i.e., include only customer 102 specified information which may include redacting customer 102 name, payment information, payment amount, etc. . . . ). As an example, a gift receipt is a limited receipt that is used for proof of a transaction for the purpose of exchanging or returning a purchased item and which omits certain information such as the price that was paid for the purchased item. The electronic receipt may include a barcode (e.g., along the bottom) so that the merchant can call up the transaction information from a database of previous purchases, authenticating an exchange or return.

In certain cases, customer 102 may elect not to indicate that the purchased item is intended for a different person/recipient at the time of purchase. For example, customer 102 may not have the necessary information regarding the intended person/recipient (e.g., name, address, email, phone, etc. . . . ) on hand at time of purchase and thus may elect not to indicate that the purchased item is intended for a different person/recipient. As such, in further embodiments, after the purchase transaction has been completed, customer 102 may obtain the necessary information regarding the intended person/recipient and then decide to have an electronic receipt for the item purchased transmitted to the intended person/recipient based on the satisfaction of at least one condition. In such instances, customer 102 access the online merchant's 110 website and logs on (e.g., enters a username/password combination or inputs a code provided by the online merchant 110 at time of the purchase) to accesses an account associated with the purchased item. Once the account has been accessed, customer 102 is again allowed to input the relevant information regarding recipient 120 and the condition, and format/information in the electronic receipt, in the same manner as described above.

Further, after inputting the relevant information regarding recipient 120, customer 102 also has the ability to access merchant's 110 website again and modify the information of recipient 120 or the form and content of the electronic receipt before the occurrence of the condition. For example, customer 102 may have a change of heart and decide not to designate recipient 120 as the person intended to receive the purchased item. In such cases, customer 102 can log in, as discussed above, to merchant's 110 website to modify provided information, such as remove recipient 120 as the person intended to receive the purchased item and/or to modify and remove/delete any electronic receipt information provided.

After receiving the purchase related information (including information regarding recipient 120, condition such as date/event, and receipt format/information), online merchant 110 may communicate either directly (e.g., over a direct communication link) or indirectly (e.g., over network 108) with server 112 to store purchase related information in database 114 for future use. Online merchant 110 and/or associated server 112 utilizes the purchase related information to generate an electronic receipt that is to be transmitted to devices 116 and 118 of recipient 120. Based on the condition (e.g., at the predetermined date or delivery confirmation), online merchant 110 and/or server 112 transmits the generated electronic receipt to recipient's 120 account (e.g., email address, telephone number, etc. . . . ) and/or different recipients over the network 108. For instance, online merchant 110 and/or server 112 may transmit an email and/or a text message to recipient's 120 email account and/or telephone number, including the electronic receipt as inline text, as an attachment (e.g., PDF, Word, etc. . . . ), and/or as a selectable link to an online location that contains the electronic receipt (e.g., online merchant's 110 website, server 112, Facebook, Twitter, etc.) which may be viewed and/or downloaded. In alternative embodiments, a service provider (e.g., third party) receives data from the merchant and generates and/or transmits the electronic receipt to recipient 120 and/or different recipients.

In response to receiving the email and/or text message, recipient 120 is able to use computer 112 and/or mobile device 118 to view, retrieve, and/or download the electronic receipt over network 108. In certain instances, the customer 102 may receive confirmation that the email and/or text including the electronic receipt or link was sent and/or accessed by recipient 120.

Referring again to FIG. 1, rather than using computer 104 and/or mobile device 106 to make an online purchase, as described above, customer 102 may elect to visit physical merchant 122 and execute an in-person purchase transaction while present at the physical merchant 122. In such instances, for example, customer 102 visits physical merchant 122 and identifies a specific item (e.g., a gift for a person/recipient 120) to purchase. The physical merchant 122 will perform a check out process that utilizes equipment for processing payment transactions related to the purchased item. For example, a barcode scanner may be used to scan a code (e.g., bar code, UPC, etc.) to obtain item information including price. Thereafter, a debit/credit card reader and/or a PayPal Here card reader in communication with a computer is used to process payment transactions and to communicate various payment related information over the network 108. The equipment, for example, processes payment transactions of cash, checks, debit/credit cards, PayPal, etc.

During the checkout process, the merchant 122 may also obtain payment related information such as customer 102 name, address, email, telephone number. At the same time, customer 102 is also given the opportunity to provide information regarding an intended person/recipient of the item purchased. For example, if the purchased item is intended as a gift for recipient 120, customer 102 is able to indicate recipient 120 information including name, address, email, telephone number, etc. Also, customer 102 is able to indicate if and when an electronic receipt of the item purchased is to be sent to computer 116 and/or mobile device 118 of recipient 120. For instance, customer 102 may indicate at least one condition, such as a specific date and/or a specific event (e.g., delivery confirmation) to transmit the electronic receipt to devices 116 and 118 of recipient 120. The specific date may be before, at, or after the time of delivery. Delivery confirmation, for example, may be received by the merchant 122 from common carriers such as United Postal Service (UPS), Federal Express (FedEx), DHL, United States Postal Service (USPS), etc. In certain embodiments, customer 102 also indicates a preferred method of delivery of the electronic receipt (e.g., email or text message).

Further, during the checkout process, customer 102 may be also able to indicate the format of the electronic receipt. For example, the customer may indicate whether the electronic receipt should be a complete sales receipt (i.e., include all information) or if it should be a limited redacted receipt (i.e., include only customer 102 specified information which may include redacting customer 102 name, payment information, payment amount, etc. . . . ). As an example, a gift receipt is a limited receipt that is used for proof of a transaction for the purpose of exchanging or returning a purchased item and which omits certain information such as the price that was paid for the purchased item. The electronic receipt may include a barcode (e.g., along the bottom) so that the merchant can call up the transaction information from a database of previous purchases, authenticating an exchange or return.

After the checkout process is complete, a receipt printer may be used to generate a physical sales receipt, which is provided to customer 102. The sales receipt may include a physical merchant's 122 website address and code which may be used to logon to the website and modify transaction information.

In certain cases, for example, customer 102 may elect not to indicate that the purchased item is intended for a different person/recipient at the time of purchase. For example, customer 102 may not have the necessary information regarding the intended person/recipient (e.g., name, address, email, phone, etc. . . . ) on hand at time of purchase and thus may elect not to indicate that the purchased item is intended for a different person/recipient. As such, in further embodiments, after the purchase transaction has been completed, customer 102 may obtain the necessary information regarding the intended person/recipient and then decide to have an electronic receipt for the item purchased transmitted to the intended person/recipient based on a condition, such as at a specified date/time or according to an event. In such instances, customer 102 may use computer 104 or mobile device 106 to access the physical merchant's 122 website, provided on the sales receipt, and log on (e.g., enter a username/password combination or input the code provided on the sales receipt) to access an account associated with the purchased item. Once the account has been accessed, customer 102 is again allowed to input the relevant information regarding recipient 120 and the electronic receipt transmission condition and receipt format/information, via a form/interface.

Further, after inputting the relevant information regarding recipient 120, customer 102 also has the ability to again access the website associated with merchant 122 website and modify the information of recipient 120 or the form and content of the electronic receipt before the condition occurrence. For example, customer 102 may have a change of heart and decide not to designate recipient 120 as the person intended to receive the purchased item. In such cases, customer 102 can log in, as discussed above, to the website associated with merchant 122 to remove recipient 120 as the person intended to receive the purchased item and/or to remove any electronic receipt information provided.

After receiving the purchase related information (including information regarding recipient 120 and condition, and receipt format), physical merchant 122 may communicate either directly (e.g., over a direct communication link) or indirectly (e.g., over network 108) with server 124 to store purchase related information in database 126 for future use. Physical merchant 122 and/or associated server 124 utilizes the purchase related information to generate an electronic receipt that is to be transmitted to devices 116 and 118 of recipient 120. Based on the satisfaction of the condition, (e.g., at the predetermined date or delivery confirmation), physical merchant 122 and/or server 124 transmits the generated electronic receipt to recipient's 120 account (e.g., email address, telephone number, etc. . . . ) and/or different recipients over the network 108. For instance, physical merchant 122 and/or server 124 may transmit an email and/or a text message to recipient's 120 email account and/or telephone number, including the electronic receipt as inline text, as an attachment (e.g., PDF, Word, etc. . . . ), and/or as a selectable link to an online location that contains the electronic receipt (e.g., online merchant's 110 website, server 112, Facebook, Twitter, etc.) which may be viewed and/or downloaded. In alternative embodiments, a service provider (e.g., third party) receives data from the merchant and generates and/or transmits the electronic receipt to recipient 120 and/or different recipients.

In response to receiving the email and/or text message, recipient 120 is able to use computer 112 and/or mobile device 118 to view, retrieve, and/or download the electronic receipt over network 108. In certain instances, the customer 102 may receive confirmation that the email and/or text including the electronic receipt or link was sent and/or accessed by recipient 120.

The various embodiments described above provide one or more advantages. For instance, a customer utilizing the above described computer and/or mobile device will experience a more efficient shopping experience by being able to specify a condition (e.g., specific date/time and/or an event) to transmit an electronic receipt to an intended recipient, thereby increasing sales for online merchants. Further, physical merchants also benefit by increasing their exposure to customers that would have been online shoppers because of the efficient shopping experience associated with the electronic receipts, thereby driving more customers to physical merchant locations. Furthermore, physical merchants that receive additional traffic also increase the probability of additional transactions that may result from impulse buys.

Figure 2:
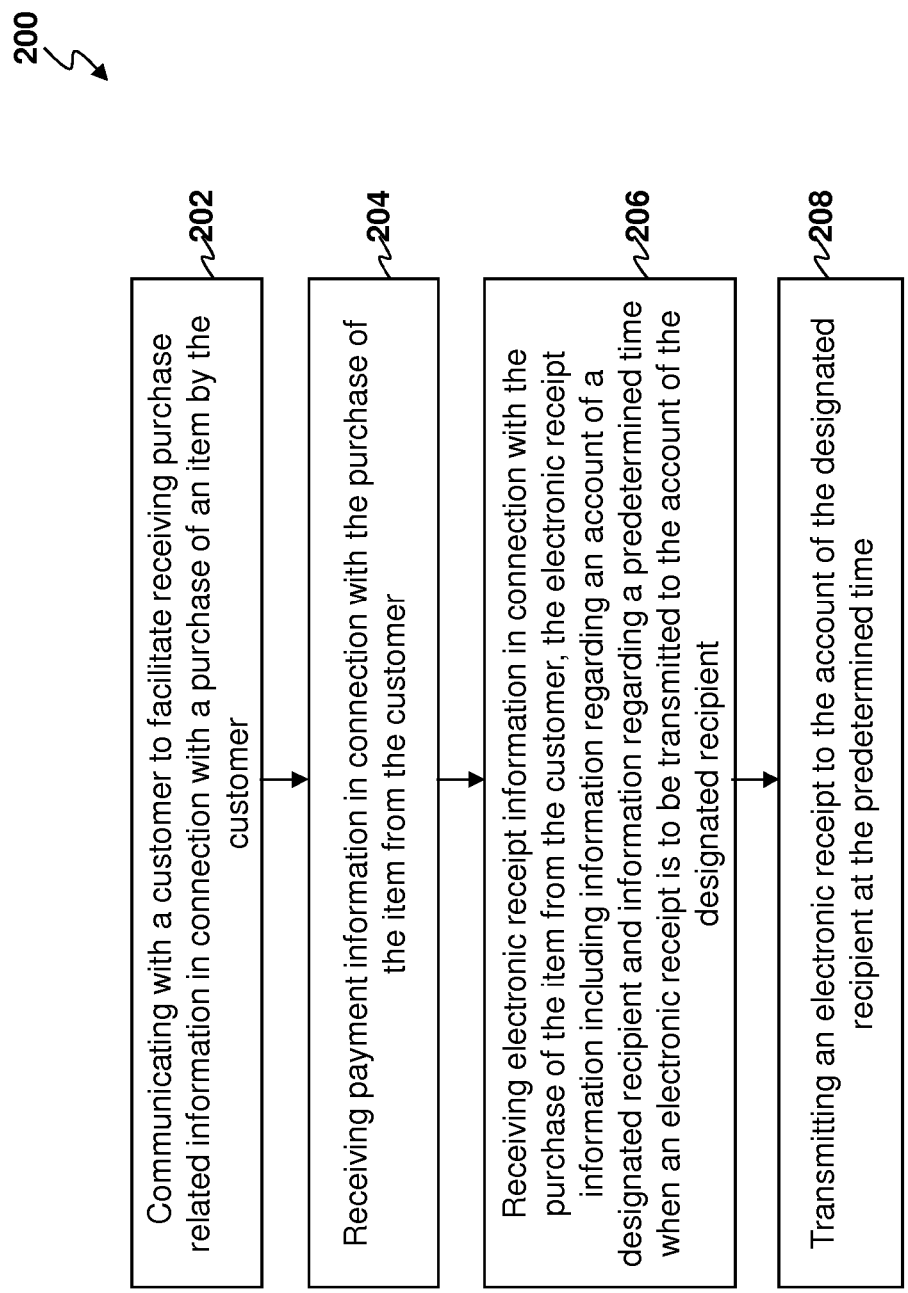
FIG. 2 is an illustration of an example method, according to various aspects of the present disclosure.

FIG. 2 is an illustration of process 200 according to one embodiment. Process 200 may be performed, for example, by an online merchant and/or by a physical merchant.

At block 202, communication occurs with a customer to facilitate receiving purchase related information in connection with a purchase of an item by the customer. The communication is between the customer and/or the customer's device and the merchant. The merchant may be, for example, an online merchant and/or a physical merchant, as discussed above.

At block 204, the payment information in connection with the purchase of the item is received from the customer. Receiving the payment information may include utilizing an interface to receive the payment information.

At block 206, electronic receipt information in connection with the purchase of the item is received from the customer. The electronic receipt information includes information regarding an account of a designated recipient and information regarding a predetermined time when an electronic receipt is to be transmitted to the account of the designated recipient. The account of the designated recipient may include an account selected from the group consisting of an email account and a telephone account.

At block 208, the electronic receipt is transmitted to the account of the designated recipient at the predetermined time. The electronic receipt may be sent to the email account of the designated recipient such that a computer of the designated recipient receives the message including the electronic receipt as an email message.

Figure 3:
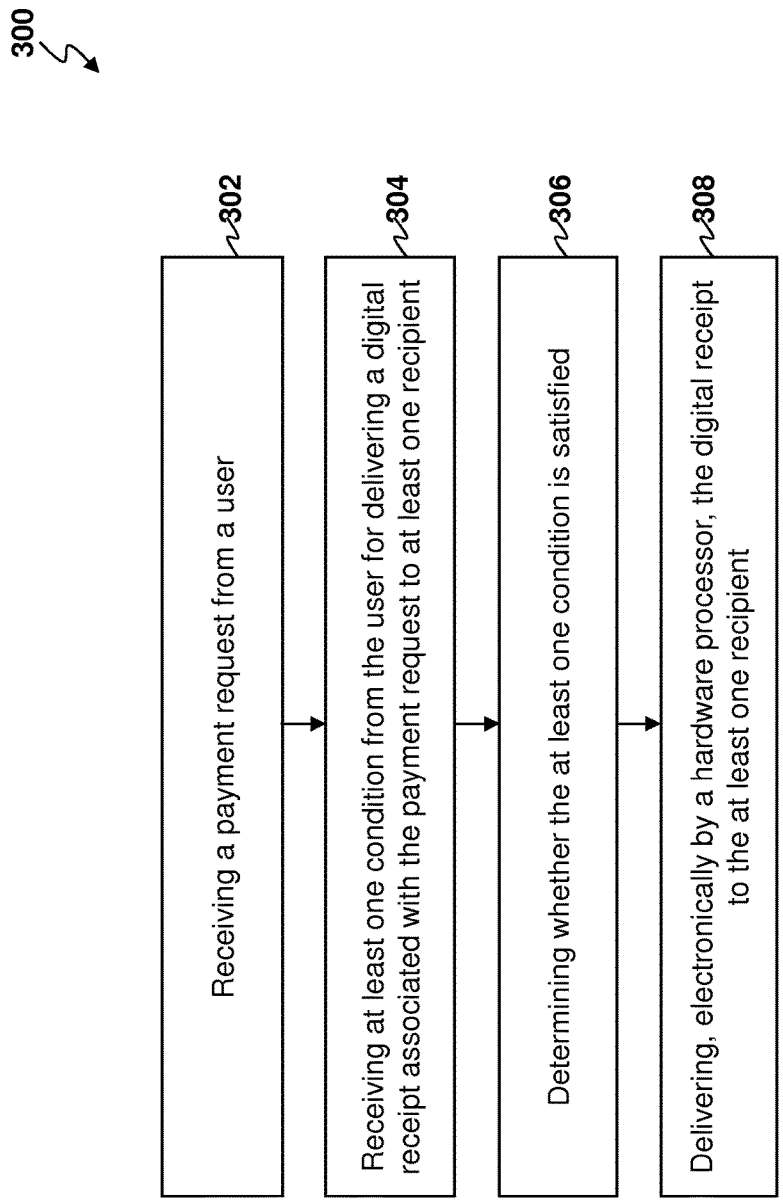
FIG. 3 is an illustration of an example method, according to various aspects of the present disclosure.

Various embodiments include an application running on an electronic device that performs a method. For instance, an application may include computer-readable code running on one or more processors. The processor executes the code to perform the actions described below. FIG. 3 is an illustration of exemplary process 300, adapted according to one embodiment, which may be performed by an application on the electronic device.

At block 302, a payment request is received from a user. The payment request may be regarding products or services for sale. For instance, a payment request regarding an item to be purchased may be provided by a customer selecting an item listed on a website of an online merchant or it may be provided at a physical merchant by scanning a code, or providing other data representative of the item at a computer terminal or an electronic cash register during a checkout process.

At block 304, at least one condition is received from the user for delivering a digital receipt associated with the payment request to at least one recipient, as discussed above. The at least one condition may comprise a date or a deliver confirmation, or any other condition, as discussed above.

At block 306, it is determined whether the at least one condition is satisfied.

At block 308, the digital receipt is delivered to the at least one recipient. The digital receipt may be delivered, for example, by a service provider, by a merchant, or by any other appropriate means.

It is understood that the processes 200 and 300 may include additional steps that may be performed before, during, or after actions described above. For example, additional steps may include gaining access to a network and/or website to the customer. Further, the customer may be required to enter a correct combination of a username and a password or a code. In some instances, the customer is prompted to become a member, if the customer is not already a member. In addition, one or more of the steps described herein may be omitted, combined, or performed in a different order as desired.

Figure 4:
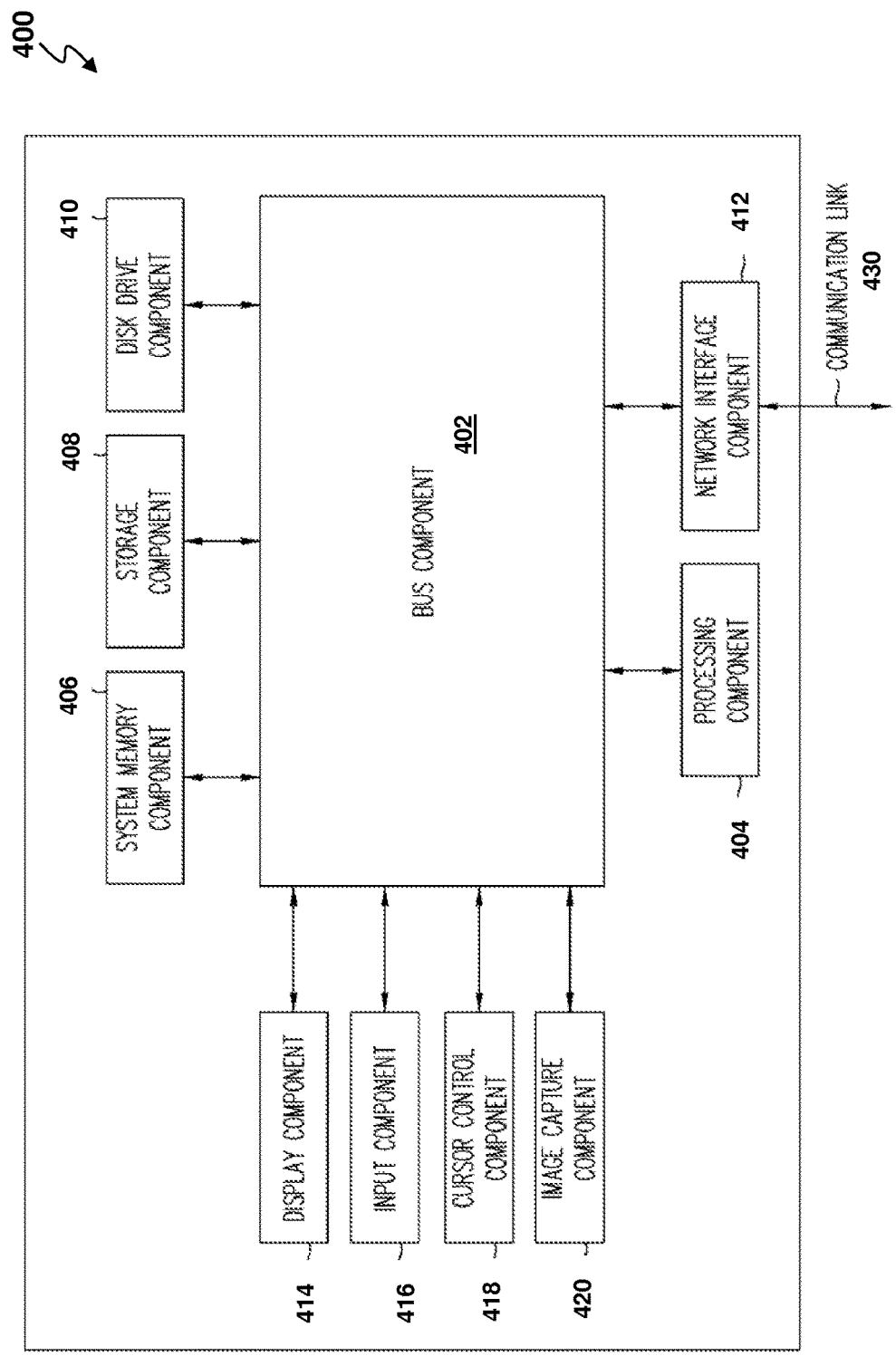
FIG. 4 is a block diagram of an example computer system suitable for implementing various methods and devices described, according to various aspects of the present disclosure.

FIG. 4 is a block diagram of an example computer system 400 suitable for implementing various methods and devices described herein, for example, the various method blocks of the method 200 and 300. In various implementations, user devices may comprise a network communications device (e.g., laptop, personal computer, tablet, mobile cellular phone, etc.) capable of communicating with a network, and a merchant device may comprise a network computing device (e.g., a network server, a computer processor, an electronic communications interface, etc). Accordingly, it should be appreciated that each of the devices may be implemented as the computer system 400 for communication with the network in a manner as follows.

In accordance with various embodiments of the present disclosure, the computer system 400, such as a computer, a mobile device, and/or a network server, includes a bus component 402 or other communication mechanisms for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., cathode ray tube (CRT) or liquid crystal display (LCD)), input component 416 (e.g., keyboard), cursor control component 418 (e.g., mouse or trackball), and image capture component 420 (e.g., analog or digital camera). In one implementation, disk drive component 410 may comprise an array having one or more disk drive components.

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of (or in combination with) software instructions to implement the present disclosure.

Logic may be encoded in a computer readable medium, which may refer to any medium that participates in providing instructions to processor 404 for execution. Such a medium may take many forms, including but not limited to, non-volatile media and volatile media. In one embodiment, the computer readable medium is non-transitory. In various implementations, non-volatile media includes optical or magnetic disks, such as disk drive component 410, and volatile media includes dynamic memory, such as system memory component 406. In one aspect, data and information related to execution instructions may be transmitted to computer system 400 via a transmission media, such as in the form of acoustic or light waves, including those generated during radio wave and infrared data communications. In various implementations, transmission media may include coaxial cables, copper wire, and fiber optics, including wires that comprise bus 402.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other non-transitory medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 430

(e.g., a communications network, such as a LAN, WLAN, PTSN, and/or various other wired or wireless networks, including telecommunications, mobile, and cellular telephone networks such as IEEE 802.11 (WiFi), IEEE 802.15 (Bluetooth), GSM, CDMA, 3G, 4G, LTE, WIMAX, DLNA, HDMI, etc.) may perform instruction sequences to practice the present disclosure in coordination with one another.

Computer system 400 may transmit and receive messages, data, information and instructions, including one or more programs (i.e., application code) through communication link 430 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   at least one non-transitory memory storing user account information; and
   one or more hardware processors coupled to the at least one non-transitory memory and configured to read instructions from the at least one non-transitory memory to cause the system to perform operations comprising:
   processing an online payment request from a customer to complete a purchase of an item and instructions to deliver the item to at least one recipient that is different from the customer;
   receiving, from the customer via a graphical user interface (GUI), an indication to exclude one or more categories of information from a digital receipt associated with the purchase;
   receiving from the customer via the GUI, at least one condition to be satisfied before transmitting the digital receipt associated with the purchase to the at least one recipient;
   determining that the at least one condition is satisfied based on receiving a delivery confirmation from a common carrier that the item has been delivered to the at least one recipient; and
   in response to determining that the at least one condition is satisfied:
   generating a particular digital receipt associated with the purchase, the particular digital receipt excluding the one or more categories of information; and
   transmitting the particular digital receipt to an email account of the at least one recipient.

2. The system of claim 1, wherein the transmitting is performed by a computer selected from a group consisting of a service provider computer and a merchant computer.

3. The system of claim 1, wherein the operations further comprise transmitting, to the customer, a confirmation message indicating that the particular digital receipt was transmitted to the at least one recipient.

4. The system of claim 1, wherein the at least one condition corresponds to a predetermined time.

5. The system of claim 4, wherein the predetermined time is different from a delivery time associated with delivery of the item to the at least one recipient.

6. A method comprising:
   processing, via an input device, a payment request from a customer to complete a purchase of an item and instructions to deliver the item to at least one recipient that is different from the customer;
   receiving, from the customer via a graphical user interface (GUI), a designation of one or more categories of information to be excluded from a digital receipt associated with the purchase;
   receiving, from the customer via the GUI, at least one condition to be satisfied before transmitting the digital receipt associated with the purchase to the at least one recipient;
   determining that the at least one condition is satisfied based on receiving, from a common carrier, a delivery confirmation that the item has been delivered to the at least one recipient; and
   in response to determining that the at least one condition is satisfied:
   generating a particular digital receipt associated with the purchase, the particular digital receipt excluding the one or more categories of information; and
   transmitting the particular digital receipt to an email account of the at least one recipient.

7. The method of claim 6 further comprising transmitting the particular digital receipt to an account of the at least one recipient via a text message.

8. The method of claim 6, further comprising transmitting, to the customer, a confirmation message indicating that the particular digital receipt was transmitted to the at least one recipient.

9. A non-transitory machine-readable medium having stored thereon machine-readable instructions executable to cause a machine to perform operations comprising:

processing a payment request from a customer to complete a purchase of an item and instructions to deliver the item to at least one recipient that is different from the customer;

receiving, from the customer via a graphical user interface (GUI), an indication to exclude one or more categories of information from a digital receipt associated with the purchase;

receiving from the customer, via the GUI, at least one condition to be satisfied before transmitting the digital receipt associated with the purchase to the at least one recipient;

determining that the at least one condition is satisfied based on receiving, from a common carrier, a delivery confirmation that the item has been delivered to the at least one recipient; and in response to determining that the condition is satisfied:
  generating a particular digital receipt associated with the purchase, the particular digital receipt excluding the one or more categories of information; and
  transmitting a selectable link corresponding to an online merchant website to the at least one recipient, the selectable link provides access to the particular digital receipt.

10. The non-transitory machine-readable medium of claim 9, wherein the at least one condition corresponds to a predetermined time.

11. The non-transitory machine-readable medium of claim 10, wherein the predetermined time is different from a delivery time associated with delivery of the item to the at least one recipient.

12. The non-transitory machine-readable medium of claim 9, wherein the machine corresponds to a computer selected from a group consisting of a service provider computer and a merchant computer.

13. The system of claim 1, wherein the operations further comprise transmitting the particular digital receipt to an account of the at least one recipient via a text message.

14. The method of claim 6, wherein the input device is selected from a group consisting of a service provider computer and a merchant computer.

15. The method of claim 6, wherein the at least one condition corresponds to a predetermined time.

16. The method of claim 15, wherein the predetermined time is different from a delivery time associated with delivery of the item to the at least one recipient.

17. The non-transitory machine-readable medium of claim 9, wherein the operations further comprise transmitting the particular digital receipt to an account of the at least one recipient via a text message.

18. The non-transitory machine-readable medium of claim 9, wherein the operations further comprise transmitting, to the customer, a confirmation message indicating that the particular digital receipt was transmitted to the at least one recipient.

* * * * *